US008458463B2

(12) United States Patent
Lu et al.

(10) Patent No.: US 8,458,463 B2
(45) Date of Patent: Jun. 4, 2013

(54) METHOD FOR SAFE OPERATION AND A SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 396 days.

(21) Appl. No.: 12/404,416

(22) Filed: Mar. 16, 2009

(65) Prior Publication Data

US 2009/0249066 A1     Oct. 1, 2009

(30) Foreign Application Priority Data

Mar. 25, 2008   (CN) .......................... 2008 1 0102730

(51) Int. Cl.
*G06F 21/00*     (2006.01)
(52) U.S. Cl.
USPC ........... 713/164; 713/150; 713/165; 713/166; 713/167; 713/2; 718/1
(58) Field of Classification Search
USPC ................. 713/164, 2, 150, 165–167; 718/1
See application file for complete search history.

(56) References Cited

U.S. PATENT DOCUMENTS

| | | | |
|---|---|---|---|
| 6,424,715 B1 * | 7/2002 | Saito | 380/201 |
| 6,460,138 B1 * | 10/2002 | Morris | 713/184 |
| 6,839,837 B1 * | 1/2005 | Morishita | 713/164 |
| 7,343,493 B2 * | 3/2008 | Challener et al. | 713/193 |
| 2001/0052069 A1 * | 12/2001 | Sekiguchi | 713/2 |
| 2005/0206353 A1 * | 9/2005 | Sengoku | 323/210 |
| 2006/0155977 A1 * | 7/2006 | Padilla et al. | 713/1 |
| 2008/0082813 A1 * | 4/2008 | Chow et al. | 713/2 |
| 2008/0104602 A1 * | 5/2008 | Takeuchi | 718/103 |
| 2008/0282351 A1 * | 11/2008 | Khilnani et al. | 726/24 |
| 2009/0013165 A1 * | 1/2009 | Chow et al. | 713/2 |
| 2009/0094447 A1 * | 4/2009 | Yang et al. | 713/2 |

FOREIGN PATENT DOCUMENTS

| | | |
|---|---|---|
| CN | 1553348 A | 12/2004 |
| CN | 1869999 A | 11/2006 |
| CN | 101256608 B | 4/2010 |
| EP | 1775881 A1 | 4/2007 |

* cited by examiner

*Primary Examiner* — Andy Rao
*Assistant Examiner* — Shan Elahi
(74) *Attorney, Agent, or Firm* — Harness, Dickey & Pierce, P.L.C.

(57) ABSTRACT

The present invention relating to computer security field provides a method for safe operation and a system thereof. The method includes: loading the compressed kernel of a safe operating system to a memory of a computer, decompressing the driver of a security device to the memory of the computer; a security master process inquiring the security device and determining whether the security device is legitimate, and if so, the safe operating system creates a security sub-process with which the safe operating system performing information interaction with the security device; verifying whether a user is legitimate, if so, permitting the safe operating system to run properly; otherwise, performing exception handling. The system includes an operating system storage device, a security device and a computer. The presented invention provides a solution that a kernel program of a safe operating system is cooperated with a security device by starting the safe operating system. In the whole process of the computer operation, the kernel of the safe operating system works with the security device, and the security device completes the verification of the user ID and the processing of file data encryption/decryption, which assures the security of the computer operation.

17 Claims, 6 Drawing Sheets

METHOD FOR SAFE OPERATION AND A SYSTEM THEREOF

This application claims priority to Chinese Patent Application No. 200810102730.7, entitled "A method for safe operation and a system thereof" and filed with the Chinese Patent Office on Mar. 25, 2008, which is hereby incorporated by reference in its entirety.

FIELD OF THE INVENTION

The present invention relates to the field of computer security, and more particularly, to a method for safe operation and a system thereof.

BACKGROUND OF THE INVENTION

At present, hard disk is mostly used as storage media in the computer system and the system is booted from the hard disk. Generally the master boot record, software of operating system, software of application system and configuration and data are kept on the hard disk. When the computer is booted, the computer loads the boot program and software of operating system according to the configuration. With the development of the computer and network, the computer system based on the hard disk has been found more and more disadvantages such as insecurity and unreliability, which can not ensure the security of the computer system.

In the process of realizing the invention, the inventor found that:

In order to ensure the security in the process of computer operation, the instructions transferred to the computer must be the ones represent the real intention of the user. If the instructions are entered into the computer and displayed for confirming, the instructions may be tampered. Only both the display and entry side are controlled completely, can the security is ensured. Security device developed recent years is convenient, safe and reliable for identification authentication. The device, called USB key briefly, employs the CA technique with the double strong factors which provide security and reliability for e-bank users and provides a USB interface for use with a computer. With a build-in CPU, storage, COS (Chip Operating System), the USB key can store a key or a digital certificate of the user and perform all kinds of algorithms for encryption/decryption or signature. The algorithm operation is performed in the security device which ensures that the key will not appear in the memory of the computer and the possibility that the key may be intercepted by a hacker is avoided.

SUMMARY OF THE INVENTION

In order to solve the insecurity in the process of computer operation in the prior art, the invention provides a method for safe operation and a system thereof. The solutions as follows:

A method for safe operation includes:

loading a compressed kernel of a safe operating system to a memory of a computer, decompressing a driver of a security device to the memory of the computer;

initializing parameters of the safe operating system;

creating a security master process and running the safe operating system;

inquiring the security device by the security master process and determining whether the security device can be found and is legitimate, if the security device is not found or is illegitimate, prompting an error message and exiting the safe operating system;

if the security device is legitimate, the safe operating system reading the encrypted kernel parameters from the security device, decrypting the encrypted kernel parameters with the key inside the security device and loading the decrypted kernel parameters to the memory of the computer;

the safe operating system creating a security sub-process with the decrypted kernel parameters by inheriting the security master process; verifying legitimacy of a user by performing information interaction between the security sub-process and the security device, if the user is legitimate, permitting the safe operating system to run properly; otherwise, performing exception handling.

After permitting the safe operating system to run properly, the method further includes:

the legitimate user sending data manipulation instructions to the security device via the safe operating system, the security device responding to the instructions or the legitimate user completing a customized task via the safe operating system;

the security device disconnecting from a computer, the safe operating system exiting the memory automatically, and releasing resource or the system being closed after the operation of the safe operating system is ended.

The step of initializing the parameters of the safe operating system includes:

interrupting initializing, interrupting request and scheduling;

initializing the driver of the security device;

allocating data buffer cache.

The kernel parameters include the information for creating the security sub-process.

The step that if the user is legitimate, permitting the safe operating system to run properly; otherwise, performing exception handling includes:

prompting the user to enter authentication information;

verifying whether the authentication information entered by the user is legitimate inside the security device;

and if so, permitting the safe operating system to run properly;

otherwise, a program in the security device determines whether the times of failed authentication reaches a preset value this time, if so, prompting an error message; otherwise, prompting the user to enter authentication information for verification once again.

The authentication information includes at least one of the following:

PIN code, user-defined code and biometrics features information of the user.

The data manipulation instructions include at least one of the following:

encryption/decryption instructions, read/write instructions and storage instructions;

the storage instructions include storing data in a storage area inside of the security device or storing the data in a storage section divided from a hard disk of the computer.

A safe operating system includes:

an operating system storage device adapted to store program of a safe operating system;

a security device adapted to verify identity of a user and process data encryption/decryption;

a computer adapted to run the program of the safe operating system and call the program of the safe operating system to determine whether the security device is legitimate, and if so, the operating system storage device works with the security device in the safe operating system; otherwise, prompting an error message and exiting the program of the safe operating system.

The operating system storage device includes:

a security master process storage module adapted to store the program for inquiring the security device, verifying legitimacy of the security device and realizing the communication between the safe operating system and the security device;

a security sub-process storage module adapted to store program for creating security sub-process and performing the information exchange between the safe operating system and the security device;

a decompressing module adapted to decompress a driver of the security device to memory of the computer.

The operating system storage device is a compact disc or a USB flash memory.

The operating system storage device is a device stored with Linux operating system or Unix operating system.

The security device includes:

a first authentication module adapted to store legitimacy information of the security device, and verify the legitimacy of the security device in the safe operating system run on the computer, and realize communication between the security device and the operating system storage device;

a second authentication module adapted to perform information interaction with the security sub-process and verify the authentication information entered by the user;

a key processing module adapted to store a key for the data encryption/decryption processing, encrypt the plaintext data entered by the user with the key and decrypt the encrypted data with the key;

a plaintext storage module adapted to store the file data in plaintext.

The security device includes:

a ciphertext data storage module adapted to store the ciphertext data obtained by encrypting plaintext data.

The security device is a removable storage device.

The computer includes:

an operating system running module adapted to run the program of the safe operating system;

a hard disk module adapted to store the data processed by the security device.

The hard disk module further includes:

a ciphertext data storage unit adapted to store the ciphertext data obtained by encrypting plaintext data.

As described above, the present invention provides a solution that a kernel program of a dedicated safe operating system is cooperated with a security device by starting the dedicated safe operating system. In the whole process of the computer operation, the kernel of the safe operating system works with the security device, and the security device completes the verification of the user ID and the processing of file data encryption/decryption, which assures the security of the computer operation.

DETAILED DESCRIPTION OF THE PREFERRED EMBODIMENTS

In order to make the purpose, technical solution and advantages clearer, the present invention is further described with the embodiments and the drawings below.

The present invention provides a solution that a kernel program of a dedicated safe operating system is cooperated with a security device by starting the dedicated safe operating system. In the whole process of the computer operation, the kernel of the safe operating system works with the security device, and the security device completes the verification of the user ID and the processing of file data encryption/decryption, which assures the security of the computer operation.

Some terms below maybe involved in the present invention.

Linux operating system: the safe operating system in the present invention is a UNIX-like operating system which is free and freely spread. The system is a system based on POSIX (Portable Operating System Interface For UNIX), and real-time and the features of the UNIX such as multi-user, multi-task, multi-thread and multi-CPU. It can perform the tool software, application and network protocol of the UNIX which are performed latterly. The system supports 32-bit and 64-bit hardware. Linux, a stable multi-user network operating system, is based on Unix designed on the network focus. Linux is mainly adapted to the computer with CPU of Intel X86 series. With open source code, Linux can be reduced as required and the reduced size of Linux system can be set to less than 1 Mb. In the embodiments of the present invention, the Linux system is optimized and edited and securely bond with USB key. The system controls the USB key directly with the optimized instructions inside the key which improves the easy-usability and security.

USB key: a hardware device with USB interface has a built-in SCM or a smart card chip which is for storing a user key or a digital certificate. The authentication of user ID is performed by the cryptography algorithm in the USB key. At present, the USB key is mainly used in two fields: one is for software copyright protection; the other is used as e-certificate container authentication logo and ID logo for the network security. Deploying the mode of CA technique with the double strong factors and combining the software and hardware, the authentication based on USB key is a technology with convenience, security and economy and solves the conflict between security and easy-usability. With the protection of the Personal Identity Number, the USB key realizes the CA technique with the double strong factors.

Embodiment 1

Figure 1:
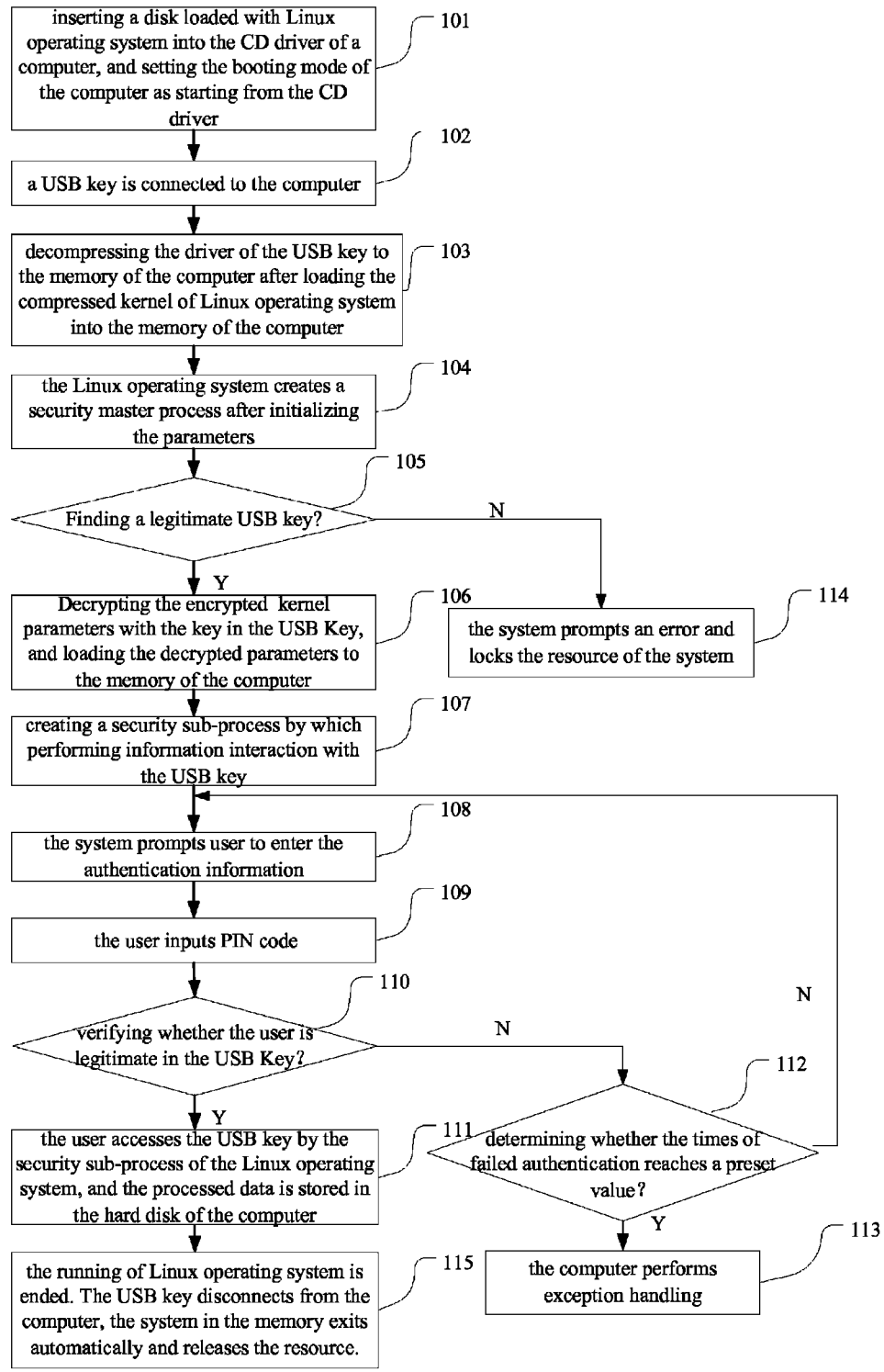
FIG. 1 is the flow chart of the method for safe operation provided in embodiment 1 of the present invention.

Referring to FIG. 1, the embodiment provides a method for a safe operating system. In the present embodiment, the safe operating system is a Linux system. The method includes:

Step 101: inserting a compact disc loaded with Linux operating system into the CD driver of a computer, and setting the booting mode of the computer as starting from the CD driver by BIOS.

Linux operating system is the safe operating system. The safe operating system also can be Unix operating system.

Step 102: a USB key is connected to the computer.

The USB key builds up the physical connection directly.

Step 103: decompressing the driver of the USB key to the memory of the computer after loading the compressed kernel of Linux operating system into the memory of the computer.

Step 104: the Linux operating system creates a security master process after initializing the parameters.

Initializing the parameters includes interrupting initializing; interrupting request and scheduling; analyzing related instructions; allocating data buffer cache etc.

Step 105: the Linux operating system runs and inquires the USB Key by the security master process and determines whether the USB key is legitimate, if the USB key is found and legitimate, go to step 106; otherwise go to step 114.

The legitimacy of the USB key is verified with the information of hardware in the USB key by the security master process of the Linux operating system.

Step 106: the Linux operating system reads the encrypted kernel parameters from the USB key and decrypts the parameters with the key in the USB Key, and loaded the decrypted parameters to the memory of the computer.

The kernel parameters are the information necessary for creating a security sub-process.

Step 107: the Linux operating system creates a security sub-process with the decrypted kernel parameters by inheriting the security master process, and performs information interaction with the USB key by the security sub-process.

In the present embodiment, the security master process can be realized by the following program:

```
Key_init_process( )    //initializing security process of the device
{
  ret = Key_dev_check( ); // searching
  a device and determining the legitimacy of the device
  if(!ret) {   /*   if the device is not found or the
  founded device is not appropriate or illegitimate */
       kill_process( );    // killing the security master process
         os_error( );      // prompting that the device is not appropriate
os_exit( );         // exiting the system and releasing the resource
     }
}
```

Key_dev_check reading the information of hardware in the device by the driver of the device, and determining whether the device is legitimate.

In the present embodiment, the Linux operating system creates key_message_process with fork( ). That is to say, the security sub-process is used for exchanging security information with the device.

Step 108: the system prompts a user to enter authentication information.

The authentication information includes at least one of the following: PIN code, user-defined code and biometric information of the user.

Step 109: the user enters PIN code.

Step 110: the USB Key verifies the identity of the user according to the entered PIN code and determines whether the user is legitimate, if so, go to step 111; otherwise go to step 112.

Step 111: the user accesses the USB key by the security sub-process of the Linux operating system, and processed data is stored in the hard disk of the computer.

Specifically, the legitimate user sends data manipulation instructions to the USB Key via the Linux operating system, the USB Key responds to the instructions or the legitimate user completes the customized task via the Linux operating system.

The processed data includes the ciphertext file obtained by encrypting the plaintext data input by the user and the processed data is stored in the hard disk which is prepared for the Windows system to use latterly.

The legitimate user sends data manipulation instructions to the USB Key via the Linux operating system, the USB Key responds to the instructions or the legitimate user completes the customized task via the Linux operating system. The data manipulation instructions include at least one of the following: encryption/decryption instructions, read/write instructions and storage instructions. In the present embodiment, the data is stored in the storage section divided from the hard disk of the computer.

Step 112: the program in the USB key determines whether the times of failed authentication reaches the preset value which is 3 in the present embodiment, if so, go to step 113, otherwise go back step 108.

Step 113: the computer performs exception handling.

In the present embodiment, when the communication process between the Linux operating system and the USB key is started, the corresponding interface service and process start. The USB Key determines the legitimacy of the user, and an interface for user to enter identification information arises, and the user must enter the correct identification information to show the legitimacy of owning the device. In the present embodiment, the process can be realized via the following program:

After executing the instruction of get_pin, the Linux operating system determines the security of the device by encrypting/decryption operation, and exits the system if an error happens.

```
ret = check_pin( );
   if(ret >= 3) {    /*If the times of
   the failed authentication reaches 3 , exits the system */
      os_exits( );
   }
```

In the method of check_pin( ), after an encrypted PIN code is entered, the PIN code is matched with code data in the database of the safe operating system. If the entered PIN code is correct, the safe operating system can be used. If the PIN code is entered wrongly for three times, exits the Linux operating system automatically.

Step 114: the Linux operating system prompts an error and locks the resource of the system.

In the present embodiment, the security sub-process obtains resource and features of the security master process. Therefore, if the USB Key is incorrect or the user is illegitimate, the system prompts an error and locks the resource of the system.

sys_set_message( ) /* sending the information to the interface of the device */ sys_get_message( ) /* obtaining the information interface of the device */

Step 115: the running of Linux operating system is ended. The USB key is disconnected from the computer, the system in the memory exits automatically and releases the resource.

In the present embodiment, the safe operating system is stored in the compact disc for booting up the computer. In the running of the safe operating system, a security device of the USB key needs to be checked for its validity when the sub-security process is created. The compact disc loaded with the safe operating system works with the security device and the legitimacy of the user is verified by the security device, which secures the computer accessing the data inside the security device in a safe operating system.

Embodiment 2

Figure 2:
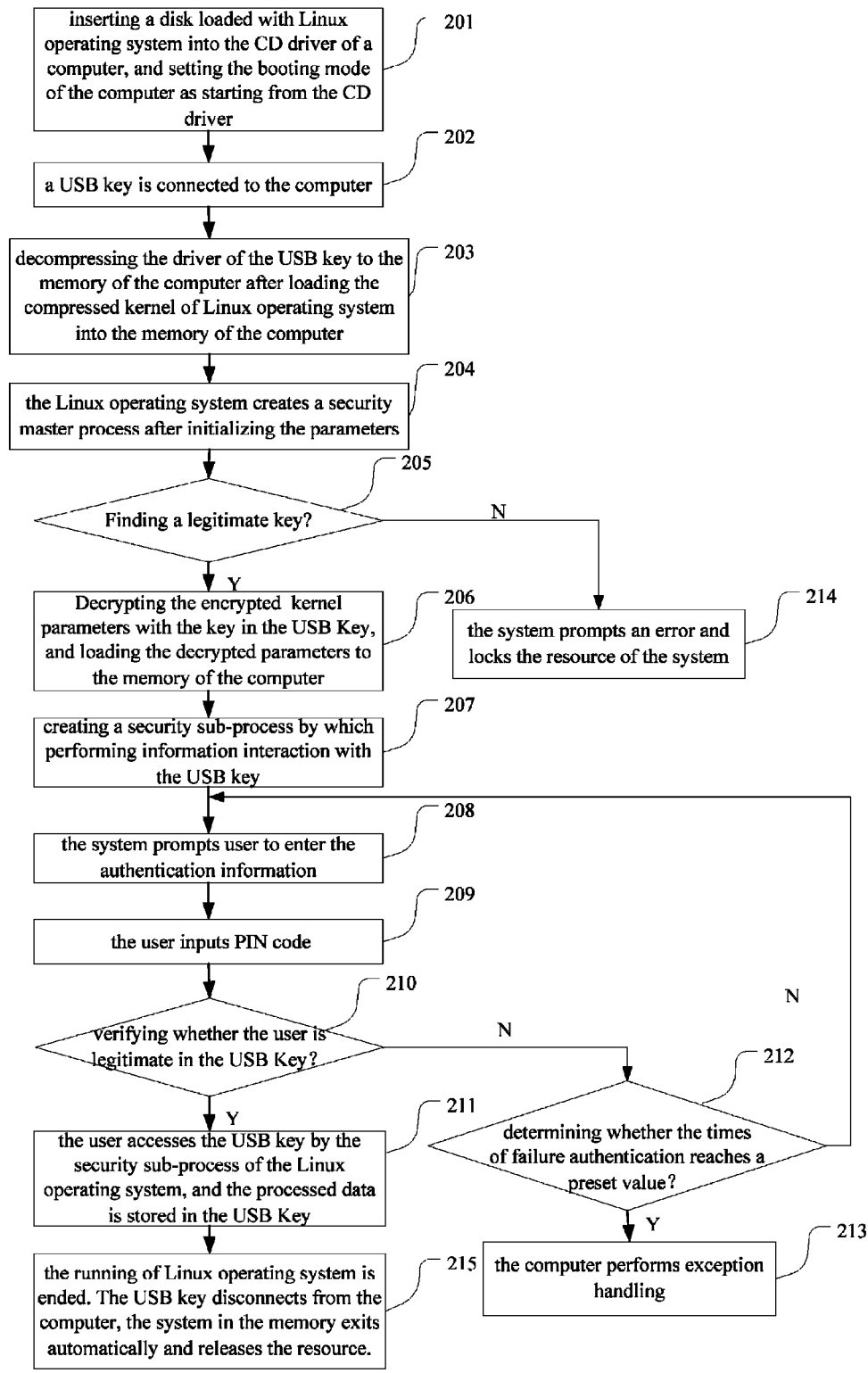
FIG. 2 is the flow chart of the method for safe operation provided in embodiment 2 of the present invention.

Referring to FIG. 2, the embodiment provides a safe operation method which includes following steps:

Step 201: inserting a compact disc loaded with Linux operating system into the CD driver of a computer, and setting the booting mode of the computer as starting from the CD driver by BIOS.

Step 202: a USB key is connected to the computer.

Step 203: decompressing the driver of the USB key to the memory of the computer after loading the compressed kernel of the Linux operating system into the memory of the computer.

Step 204: the Linux operating system creates a security master process after initializing the parameters.

Step 205: the Linux operating system runs and inquires the USB Key by the security master process and determines whether the USB key is legitimate, if the USB key is found and legitimate, go to step 206; otherwise go to step 214.

In the present embodiment, the legitimacy of the USB key is verified with the information of hardware in the USB key by the security master process of the Linux operating system.

Step 206: the Linux operating system reads the encrypted kernel parameters from the USB key and decrypts the parameters with the key in the USB Key, and loaded the decrypted parameters to the memory of the computer.

Step 207: the Linux operating system creates a security sub-process with the decrypted kernel parameters by inheriting the security master process, and performs information interaction with the USB key by the security sub-process.

In the present embodiment, the security master process can be realized by the following program:

```
Key_init_process( )
{
    ret = Key_dev_check( ); // searching a
    device and determining the legitimacy of the device
    if(!ret) {   /*    if the device is not found or the
founded device is not appropriate or illegitimate */
        kill_process( );   // killing the security master process
        os_error( );       // prompting that the device is not appropriate
os_exit( );       // exiting the system and releasing the resource
    }
}
```

In the present embodiment, the Linux operating system creates key_message_process with fork( ). That is to say, the security sub-process is used for exchanging security information with the device.

Step 208: the system prompts a user to enter authentication information.

Step 209: the user enters PIN code.

Step 210: the USB key verifies the identity of the user according to the entered PIN code and determines whether the user is legitimate, if so, go to step 211; otherwise go to step 212.

Step 211: the user accesses the USB key by the security sub-process of the Linux operating system, and processed data is stored in the USB Key.

The difference between the present embodiment and embodiment 1 lies that the processed data is stored in the USB Key, so that the data storage is more flexible; the processed data includes the cryptograph file obtained by encrypting the plaintext data input by the user.

Step 212: the program in the USB Key determines whether the times of failed authentication reaches the preset value which is 4 in the present embodiment, if so, go to step 213; otherwise go back step 208.

Step 213: the computer performs exception handling.

In the present embodiment, when the communication process between the Linux operating system and the USB key is started, the corresponding interface service and process are started. The USB Key determines the legitimacy of the user, and an interface for user to enter identification information arises, and the user must enter the correct identification information to show the legitimacy of owning the device. In the present embodiment, the process can be realized via the following program:

After executing the instruction of get_pin, the Linux operating system determines the security of the device by operation, and exits the system if an error happens.

```
ret = check_pin( );
    if(ret >= 4) {   /*If the times of the
    failed authentication reaches 4 , exits the system */
        os_exit( );
    }
```

Step 214: the Linux operating system prompts an error and locks the resource of the system.

In the present embodiment, the security sub-process obtains resource and features of the security master process. Therefore, if the USB Key is incorrect or the user is illegitimate, the system prompts an error and locks the resource of the system.

sys_set_message( ) /* sending the information to the interface of the device */ sys_get_message( ) /* obtaining the information interface of the device */

Step 215: The running of the Linux operating system is ended, and the USB Key is disconnected from the computer, and the system in the memory exits automatically and releases the resource.

In the present embodiment, the processed data is stored in the USB Key but not in the hard disk of the computer, which realized the flexibility of data storage.

Embodiment 3

Figure 3:
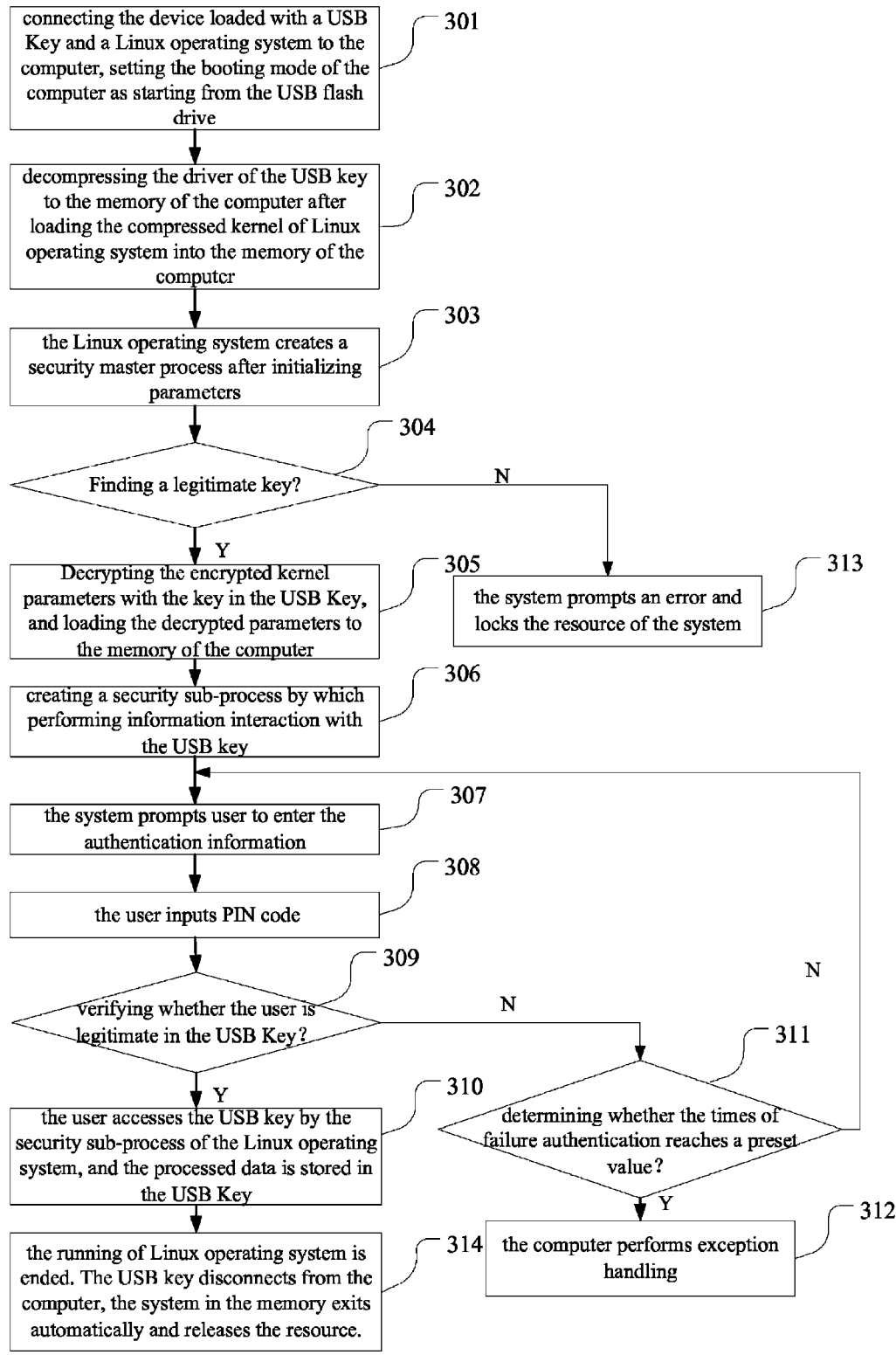
FIG. 3 is the flow chart of the method for safe operation provided in embodiment 3 of the present invention.

Referring to FIG. 3, the embodiment provides a safe operation method which includes following steps:

Step 301: Starting a computer, connecting a device loaded with a USB Key and Linux operating system to the computer, setting the booting mode of the computer as starting from the USB flash drive via BIOS.

Step 302: decompressing the driver of the USB key to the memory of the computer after loading the compressed kernel of the Linux operating system into the memory of the computer.

Step 303: the Linux operating system creates a security master process after initializing the parameters.

Step 304: the Linux operating system runs and inquires the USB Key by the security master process and determines whether the USB key is legitimate, if the USB key is found and legitimate, go to step 305; otherwise go to step 314.

In the present embodiment, the legitimacy of the USB key is verified with the information of hardware in the USB key by the security master process of the Linux operating system.

Step 305: the Linux operating system reads the encrypted kernel parameters from the USB key and decrypts the parameters with the key in the USB Key, and loaded the decrypted parameters to the memory of the computer.

Step 306: the Linux operating system creates a security sub-process with the decrypted kernel parameters by inheriting the security master process, and performs information interaction with the USB key by the security sub-process.

In the present embodiment, the security master process can be realized by the following program:

```
Key_init_process( )
{
    ret = Key_dev_check( ); // searching a
    device and determining the legitimacy of the device
    if(!ret) {   /*  if the device is not
found or the founded device is not appropriate or illegitimate */
        kill_process( );    // killing the security master process
        os_error( );        // prompting that the device is not appropriate
os_exit( );     // exiting the system and releasing the resource
    }
}
```

In the present embodiment, the Linux operating system creates key_message_process with fork( ). That is to say, the security sub-process is used for exchanging security information with the device.

Step 307: the system prompts a user to enter authentication information.

Step 308: the user enters PIN code.

Step 309: the USB key verifies the identity of the user according to the entered PIN code and determines whether the user is legitimate, if so, go to step 310; otherwise go to step 311.

Step 310: the user accesses the USB key by the security sub-process of the Linux operating system, and processed data is stored in the USB Key.

Step 311: the program in the USB key determines whether the times of failed authentication reaches the preset value which is 5 in the present embodiment, if so, go to step 312, otherwise go back step 307.

Step 312: the computer performs exception handling.

In the present embodiment, when the communication process between the Linux operating system and the USB key is started, the corresponding interface service and process are started. The USB Key determines the legitimacy of the user, and an interface for user to enter identification information arises, and the user must enter the correct identification information to show the legitimacy of owning the device. In the present embodiment, the process can be realized via the following program:

After executing the instruction of get_pin, the Linux operating system determines the security of the device by operation, and exits the system if an error happens.

```
        ret = check_pin( );
            if(ret >= 5) {   /*If the times of the failed
            authentication reaches 5 , exits the system */
                os_exit( );
            }
```

Step 313: the Linux operating system prompts an error and locks the resource of the system.

In the present embodiment, the security sub-process obtains resource and features of the security master process. Therefore, if the USB Key is incorrect or the user is illegitimate, the system prompts an error and locks the resource of the system.

sys_set_message( ) /* sending the information to the interface of the device */ sys_get_message( ) /* obtaining the information interface of the device */

Step 314: The running of the Linux system is ended, and the USB Key is disconnected from the computer, and the system in the memory exits automatically and releases the resource.

In the present embodiment, the safe operating system is stored in the USB flash drive for booting up the computer. In the running of the safe operating system, a security device of USB Key need be checked for its validity when the sub-security process is created. The USB flash drive loaded with the safe operating system works with the security device and the legitimacy of the user is verified by the security device, which secures the computer accessing the data inside the security device in a safe operating system.

Embodiment 4

Figure 4:
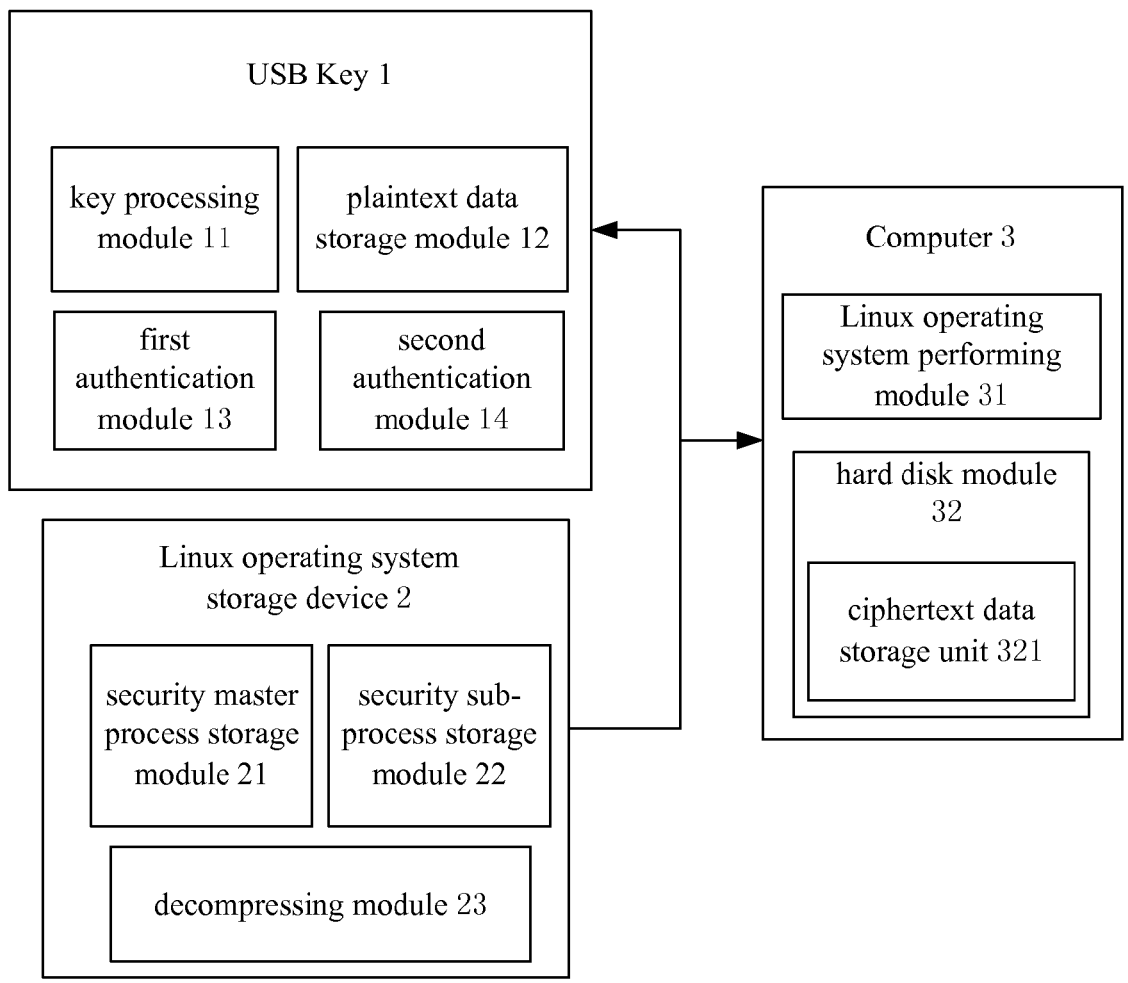
FIG. 4 is the schematic diagram of the safe operating system provided in embodiment 4 of the present invention.

Referring to FIG. 4, the present embodiment provides a safe operating system which includes: a USB Key 1, a Linux operating system storage device 2 and a computer 3.

The USB key 1 is adapted to verify the identity of a user and process data encryption/decryption, which includes a key process module 11, a plaintext data storage module 12, a first authentication module 13 and a second authentication module 14.

The Linux operating system storage device 2 is adapted to store program of the safe operating system. Specifically, the program of the safe operating system is the program of Linux operating system. The Linux operating system storage device 2 includes a security master process storage module 21, a security sub-process storage module 22 and a decompressing module 23.

The computer 3 is adapted to run program of Linux operating system and call the program of the Linux operating system to determine whether the USB key 1 is legitimate. Specifically, the computer 3 includes: a Linux operating system running module 31 and a hard disk module 32 which includes a ciphertext data storage unit 321.

The operating system storage device can be a Linux operating system storage device or a Unix operating system storage device. Specifically, the operating system storage device in the present embodiment is a Linux operating system storage device. The carrier of the Linux operating system is compact disc. That is to say, the Linux operating system storage device 2 is a compact disc. The security device is a USB Key. Alternatively, the Linux operating system storage device 2 also can be built in the USB key, which is to be introduced in embodiment 6.

The working principles of every part of the system are described as follows:

The key process module 11 is adapted to store encryption/decryption keys and encrypt the plaintext data entered by the user and decrypt the encrypted data with the encryption/decryption keys, and verify the identity of user.

The plaintext data storage module 12 is adapted to store the plaintext data entered by the user;

The first authentication module 13 is adapted by the Linux operating system to verify the legitimacy of the USB key 1 and realize the communication between the USB Key 1 and the Linux operating system;

The second authentication module 14 is adapted to verify the legitimacy of the user and realize the information exchange between the USB key 1 and the Linux operating system.

In the embodiment, the Linux operating system storage device 2 is a compact disc for storing the program of the Linux operating system;

The security master process storage module 21 is adapted by Linux operating system to inquire the USB key 1 and verify its legitimacy and realize the communication between the USB key 1 and the Linux operating system;

The security sub-process storage module 22 is adapted to create security sub-process and realize the information exchange between the Linux operating system and the USB key 1;

The decompressing module 23 is adapted to decompress the diver of the USB key 1 to the memory of the computer.

The Linux operating system running module 31 is adapted to introduce the boot loader to the memory of the computer 3 in the process of the computer 3 starting, and run the Linux operating system after the computer 3 starts, access the plaintext data storage module 12 in the USB Key 1 and the ciphertext data storage unit 321 in the computer 3, and send the data encryption/decryption instructions to the USB key 1;

The ciphertext data storage unit 321 is adapted to store the ciphertext files obtained by encrypting plaintext data of the plaintext data storage module 12 by the key processing module 11.

In the embodiment, the safe operating system is stored in the compact disc for booting up the computer. In the process of running the safe operating system, a security device of USB Key needs to be checked for its validity when the security sub-process is created. The compact disc loaded with the safe operating system works with the security device by which the user is verified, which secures the computer accesses the data inside the security device in a safe operating system.

Embodiment 5

Figure 5:
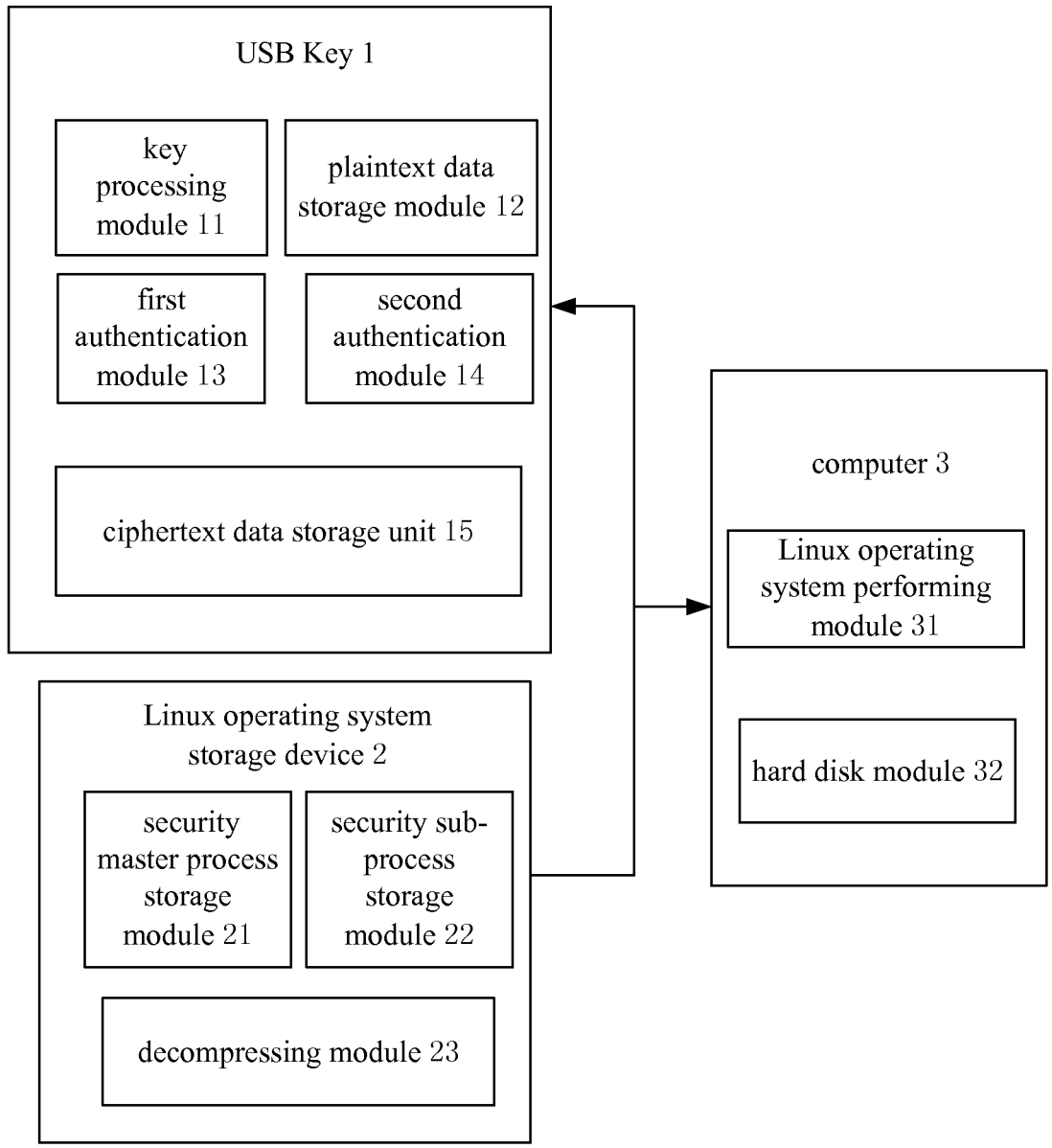
FIG. 5 is the schematic diagram of the safe operating system provided in embodiment 5 of the present invention.

Referring to FIG. 5, the embodiment provides a safe operating system including a USB Key 1, a Linux operating system storage device 2 and a computer 3. The USB key 1 includes a key processing module 11, a plaintext data storage module 12, a first authentication module 13, a second authentication module 14 and an ciphertext data storage module 15;

The Linux operating system storage device 2 includes a security master process storage module 21, a security sub-process storage module 22 and a decompressing module 23;

The computer 3 includes a Linux operating system running module 31 and a hard disk module 32.

In the embodiment, the carrier of the Linux operating system is a compact disc. That is to say, the Linux operating system storage device 2 is a compact disc for storing program of the Linux operating system; the security device is a USB key.

The difference between embodiment 5 and embodiment 4 lies that in embodiment 5 the ciphertext data storage module 15 is built in the USB Key 1. Thereby, the hard disk module 32 need not provide a divided area for ciphertext data storage unit, which makes the storage of the ciphertext data to be more flexible. The working principles of other parts in the system provided in embodiment 5 are the same with embodiment 4; the repetitious details will not be given here.

Embodiment 6

Figure 6:
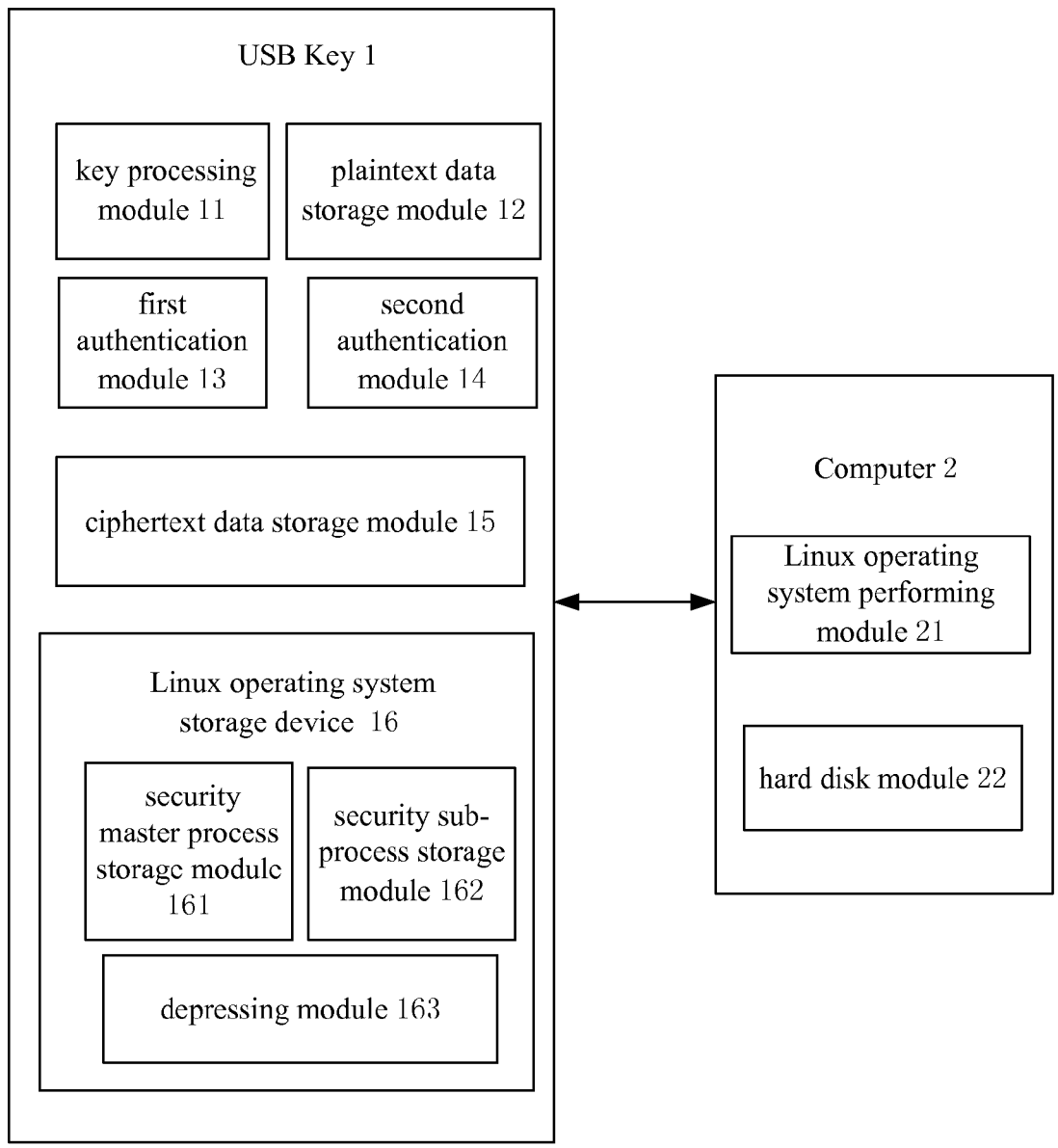
FIG. 6 is the schematic diagram of the safe operating system provided in embodiment 6 of the present invention.

Referring to FIG. 6, the embodiment provides a safe operating system including a USB Key 1 and a computer 2. The USB key 1 includes a key processing module 11, a plaintext data storage module 12, a first authentication module 13, a second authentication module 14, an ciphertext data storage module 15 and a Linux operating system storage device 16;

The Linux operating system storage device 16 includes a security master process storage module 161, a security sub-process storage module 162 and a depressing module 163;

The computer 2 includes a Linux operating system running module 21 and a hard disk module 22.

Differing from the embodiment 5, in the present embodiment, the Linux operating system storage device 16 is adapted to store program of Linux operating system. The Linux operating system stored in the USB Key device 1 is physically bound with the key processing module 11, the plaintext data storage module 12, the first authentication module 13, the second authentication module 14. The working principles of other parts in the system provided in embodiment 6 are the same with embodiment 5; the repetitious details will not be given here.

In the embodiment, the Linux operating system storage device 16 is integrated in the USB Key 1, which realizes the diversity of the carrier for the operating system.

In the embodiment, the operating system storage device can be a device for storing Unix operating system.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A method for safe operation, comprising:
   loading, by a computer, a compressed kernel of a safe operating system to a memory of the computer, decompressing a driver of a security device to the memory of the computer;
   initializing, by the computer, parameters of the safe operating system;
   creating, by the computer, a security master process and running the safe operating system;
   inquiring, by the computer, the security device by the security master process and determining whether the security device is found and is legitimate; if the security device is not found or is illegitimate, prompting an error message and exiting the safe operating system;
   if the security device is legitimate, the safe operating system reading encrypted kernel parameters from the security device, decrypting the encrypted kernel parameters with a key inside the security device and loading the decrypted kernel parameters to the memory of the computer, wherein the decrypted kernel parameters are information necessary for creating a security sub-process, the security sub-process is used for exchanging security information with the security device; and
   the safe operating system creating the security sub-process with the decrypted kernel parameters by inheriting the security master process, verifying legitimacy of a user by performing information interaction between the security sub-process and the security device, if the user is legitimate, permitting the safe operating system to run properly; otherwise, performing exception handling.

2. The method for safe operation of claim 1, wherein, after permitting the safe operating system to run properly, the method further comprises:
   the legitimate user sending data manipulation instructions to the security device via the safe operating system, the security device responding to the instructions or the legitimate user completing a customized task via the safe operating system; and
   the security device disconnecting from a computer, the safe operating system exiting the memory automatically and releasing resource or the system being closed after the operation of the safe operating system is ended.

3. The method for safe operation of claim 1, wherein the step of initializing the parameters of the safe operating system comprises:

interrupting initializing, interrupting request and scheduling;
initializing the driver of the security device; and
allocating data buffer cache.

4. The method for safe operation of claim 1, wherein the step that if the user is legitimate, permitting the safe operating system to run properly; otherwise, performing exception handling comprises:
prompting the user to enter authentication information;
verifying whether the authentication information entered by the user is legitimate inside the security device;
and if so, permitting the safe operating system to run properly;
otherwise, a program in the security device determines whether times of failed authentication reaches a preset value, if so, prompting an error message; otherwise, prompting the user to enter authentication information for verification once again.

5. The method for safe operation of claim 4, wherein the authentication information comprises at least one of the following:
PIN code, user-defined code and biometrics features information of the user.

6. The method for safe operation of claim 2, wherein the data manipulation instructions comprise at least one of the following:
encryption/decryption instructions, read/write instructions and storage instructions; and
the storage instructions comprise storing data in a storage area inside of the security device or storing the data in a storage section divided from a hard disk of the computer.

7. A safe operating system, comprising:
an operating system storage device adapted to store program of a safe operating system;
a security device adapted to verify identity of a user and process data encryption/decryption; and
a computer adapted to run the program of the safe operating system and call the program of the safe operating system to determine whether the security device is legitimate, and if so, the operating system storage device works with the security device in the safe operating system; otherwise, prompting an error message and exiting the program of the safe operating system;
wherein the operating system storage device comprises:
a security master process storage module adapted to store program for inquiring the security device, verifying legitimacy of the security device and realizing communication between the safe operating system and the security device;
a security sub-process storage module adapted to store program for creating security sub-process and performing information exchange between the safe operating system and the security device; and
a decompressing module adapted to decompress a driver of the security device to memory of the computer.

8. The safe operating system of claim 7, wherein the operating system storage device is a compact disc or a USB flash memory.

9. The safe operating system of claim 7, wherein the operating system storage device is a compact disc or a USB flash memory.

10. The safe operating system of claim 7, wherein the operating system storage device is a device stored with Linux operating system or Unix operating system.

11. The safe operating system of claim 7, wherein the operating system storage device is a device stored with Linux operating system or Unix operating system.

12. The safe operating system of claim 7, wherein the security device comprises:
a first authentication module adapted to store legitimacy information of the security device, and verify the legitimacy of the security device in the safe operating system and realize communication between the security device and the operating system storage device;
a second authentication module adapted to perform information interaction with the security sub-process and verify authentication information entered by the user;
a key processing module adapted to store a key for data encryption/decryption processing, encrypt plaintext data entered by the user with the key and decrypt the encrypted data with the key; and
a plaintext data storage module adapted to store file data in plaintext.

13. The safe operating system of claim 7, wherein the security device comprises:
a ciphertext data storage module adapted to store ciphertext data obtained by encrypting plaintext data.

14. The safe operating system of claim 12, wherein the security device comprises:
a ciphertext data storage module adapted to store the ciphertext data obtained by encrypting plaintext data.

15. The safe operating system of claim 13, wherein the security device is a removable storage device.

16. The safe operating system of claim 7, wherein the computer comprises:
an operating system running module adapted to run program of the safe operating system; and
a hard disk module adapted to store data processed by the security device.

17. The safe operating system of claim 16, wherein the hard disk module further comprises:
a ciphertext data storage unit adapted to store the ciphertext data obtained by encrypting plaintext data.

* * * * *